(12) United States Patent
Durst et al.

(10) Patent No.: US 7,336,227 B2
(45) Date of Patent: *Feb. 26, 2008

(54) PORTABLE POSITION DETERMINING DEVICE

(75) Inventors: Jennifer Durst, Muttontown, NY (US); Eugene F. Fowler, Richardson, TX (US); Joseph C. McAlexander, Murphy, TX (US)

(73) Assignee: Pfizer, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/446,318

(22) Filed: Jun. 2, 2006

(65) Prior Publication Data

US 2008/0001814 A1 Jan. 3, 2008

Related U.S. Application Data

(63) Continuation of application No. 10/292,888, filed on Nov. 11, 2002, now Pat. No. 7,113,126, which is a continuation of application No. 09/860,375, filed on May 18, 2001, now Pat. No. 6,480,147, which is a continuation of application No. 09/678,571, filed on Oct. 3, 2000, now Pat. No. 6,441,778, which is a continuation-in-part of application No. 09/362,788, filed on Jul. 28, 1999, now Pat. No. 6,172,640.

(60) Provisional application No. 60/140,040, filed on Jun. 18, 1999.

(51) Int. Cl.
*H04B 7/185* (2006.01)
*G01S 5/02* (2006.01)

(52) U.S. Cl. ............................. 342/357.09; 342/357.06; 342/357.07; 701/213

(58) Field of Classification Search ........... 342/357.01, 342/357.06, 357.07, 357.09; 701/213, 215; 455/422.1

See application file for complete search history.

(56) References Cited

U.S. PATENT DOCUMENTS

| 4,879,755 A | 11/1989 | Stolarczyk et al. |
| 4,949,089 A | 8/1990 | Ruszkowski, Jr. |
| 5,043,736 A | 8/1991 | Darnell et al. |
| 5,207,179 A | 5/1993 | Arthur et al. |
| 5,223,844 A | 6/1993 | Mansell et al. |
| 5,225,842 A | 7/1993 | Brown et al. |
| 5,389,934 A | 2/1995 | Kass |
| 5,418,537 A | 5/1995 | Bird |
| 5,423,056 A | 6/1995 | Linquist et al. |

(Continued)

OTHER PUBLICATIONS

Frierman S., "G.P.S. Collars: A New Way to Tell When the Cows Come Home", *The New York Times*, 1 page (2000).

(Continued)

*Primary Examiner*—Dao Phan
(74) *Attorney, Agent, or Firm*—Scully, Scott, Murphy & Presser, P.C.

(57) ABSTRACT

A position determining device is disclosed comprising a satellite navigation receiver for automatically providing computed position information, when the device has changed its position relative to a predetermined location, to a paging transmitter for transmission to a paging receiver for readout of the computed position information. The readout may be in the form of coordinates and may be accompanied by a message or alarm. The device may be configured as a portable unit of small size and economical manufacture.

1 Claim, 9 Drawing Sheets

U.S. PATENT DOCUMENTS

| | | |
|---|---|---|
| 5,461,390 A | 10/1995 | Hoshen |
| 5,485,163 A | 1/1996 | Singer |
| 5,555,286 A | 9/1996 | Tendler et al. |
| 5,594,425 A | 1/1997 | Ladner et al. |
| 5,629,678 A | 5/1997 | Gargano et al. |
| 5,650,770 A | 7/1997 | Schlager et al. |
| 5,652,570 A | 7/1997 | Lepkofker |
| 5,661,652 A | 8/1997 | Sprague et al. |
| 5,708,971 A | 1/1998 | Dent |
| 5,726,660 A | 3/1998 | Purdy et al. |
| 5,742,233 A | 4/1998 | Hoffman et al. |
| 5,857,433 A | 1/1999 | Files |
| 5,868,100 A | 2/1999 | Marsh |
| 5,898,391 A | 4/1999 | Jefferies et al. |
| 5,926,086 A | 7/1999 | Escareno et al. |
| 5,963,130 A | 10/1999 | Schlager et al. |
| 6,006,159 A | 12/1999 | Schmier et al. |
| 6,043,748 A | 3/2000 | Touchton et al. |
| 6,067,018 A | 5/2000 | Skelton et al. |
| 6,069,570 A | 5/2000 | Herring |
| 6,131,067 A | 10/2000 | Girerd et al. |
| 6,172,640 B1 | 1/2001 | Durst et al. |
| 6,236,358 B1 | 5/2001 | Durst et al. |
| 6,243,039 B1 | 6/2001 | Elliot |
| 6,259,399 B1 | 7/2001 | Krasner |
| 6,271,757 B1 | 8/2001 | Touchton et al. |
| 6,289,279 B1 | 9/2001 | Ito et al. |
| 6,297,768 B1 | 10/2001 | Allen, Jr. |
| 6,362,778 B2 | 3/2002 | Neher |
| 6,407,698 B1 | 6/2002 | Ayed |
| 6,441,778 B1 | 8/2002 | Durst et al. |
| 6,480,147 B2 | 11/2002 | Durst et al. |
| 7,113,126 B2 * | 9/2006 | Durst et al. ............ 342/357.07 |

OTHER PUBLICATIONS

Koshima K. et al., "Personal Locator Services Emerge", *Spectrum, Evolutionary Computing*, pp. 41-48 (2000).
Ward A., "GPS Tracking System Finds Missing Kids", *Fort Worth Star-Telegram*, 2 pages (1999).
Yeadon G., "Computerized Collar Creates World's First Radio-Controlled Dog?", *Access Internet Magazine*, 2 pages (1999).
Bolton K., "Looking in on a Loved One", *The New York Times*, Sec. 3, p. 2, 1 page (2002).

* cited by examiner

PORTABLE POSITION DETERMINING DEVICE

CROSS REFERENCE TO RELATED APPLICATIONS

The present application is a Continuation of U.S. patent application Ser. No. 10/292,888 filed Nov. 11, 2002, now U.S. Pat. No. 7,113,126 which is a Continuation of U.S. patent application Ser. No. 09/860,375 filed May 18, 2001, now U.S. Pat. No. 6,480,147 which is a Continuation of U.S. patent application Ser. No. 09/678,571 filed Oct. 3, 2000, now U.S. Pat. No. 6,441,778 which is a Continuation-in-Part of U.S. patent application Ser. No. 09/362,788 filed Jul. 28, 1999, now U.S. Pat. No. 6,172,640 which claims priority of U.S. Patent Application Ser. No. 60/140,040 filed Jun. 18, 1999.

TECHNICAL FIELD OF THE INVENTION

The present disclosure pertains generally to electronic locating devices for determining the location or position of a pet or an object, and more particularly, a device for determining the location or position of a pet by utilizing the capabilities of two-way paging systems and satellite navigation systems.

BACKGROUND OF THE INVENTION

Tracking the location of an individual or an object or even an animal such as a domesticated animal or a pet that can move in unknown directions over a considerable range of territory has been a concern for a number of years. A number of systems have been proposed which employ existing wireless communication capabilities but which tend to be cumbersome, bulky, expensive or all of the above. With the advent of satellite navigation systems such as the global positioning system (GPS) services in the U.S.A. or the Global Navigation Satellite System (GLONASS) in Russia, it has been possible to provide relatively inexpensive location systems for determining the location of a moving object. This type of system has typically been utilized on trucks to provide location information for companies that have large fleets of trucks in use at any one particular time. The position of an individual truck is determined by coincident reception of signals from at least three navigation satellites by a satellite navigation system receiver, which position can then be stored or can be transmitted to a central receiving station via some sort of wireless link. Moreover, the wireless link can be a two-way communication link wherein the positioning information is only transmitted in response to receiving a request. One disadvantage, particularly in a small, portable unit, is that the satellite navigation system receiver that much be included in a locating device requires the use of substantial electrical energy during the period in which the location information is being acquired and developed from the GPS system. Further, a small portable object locator, in addition to minimizing the use of electrical power while being subject to less than ideal orientations to enable quick and efficient location by the GPS system, must also be very simple and easy to use.

SUMMARY OF THE INVENTION

In one embodiment, a locating device is disclosed for attachment to an animal and adapted to obtain and communicate location information about the animal to a fixed or mobile base station, comprising a controller having a memory, an input for location data and a first communication port; a satellite navigation system receiver coupled to a first antenna and having a location data output coupled to the location data input of said controller; a communication transceiver coupled to a second antenna to receive and transmit communications between the locating device and the base station and having a second communication port coupled to the first communication port of the controller; and a housing to enclose the controller, the satellite navigation system receiver and communication transceiver, configured to be attached to the animal. The controller upon activation operates automatically to obtain location data from the satellite navigation system receiver via the location data output, store the location data in the memory and cause the location data to be accessed from the memory, coupled to the communication transceiver and transmitted to the base station.

In another aspect the controller in the locating device is adapted to become activated when the locating device is secured to the animal, power is coupled to the locating device and the animal passes a perimeter enclosing an area. The perimeter is specified by one or a plurality of coordinate positions defined by the location data obtained by the locating device.

In another aspect a system is disclosed for locating a mobile object beyond a designated area comprising a wireless bidirectional communication system, a first transceiver operable as a fixed or mobile base station in said communication system to receive and display location information and transmit commands, and a locating device attached to the mobile object and operable as a mobile station in said communication system to respond to the commands and, upon activation, to obtain location information and transmit it to the first transceiver.

In another aspect of the present disclosure, the operation of enabling the satellite navigation system receiver in the object locator may be controlled by duty cycle controls which activate the satellite navigation system receiver to periodically check the location of the animal or object. Upon determining that the animal or object is outside a specified perimeter designating an area, a message signifying such location is automatically transmitted to a base station.

In another aspect a position determining device is disclosed comprising a satellite navigation receiver for automatically providing computed position information, when the device has changed its position relative to a predetermined location, to a paging transmitter for transmission to a paging receiver for readout of the computed position information. The readout may be in the form of coordinates and may be accompanied by a message or alarm. The device may be configured as a portable unit of small size and economical manufacture.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
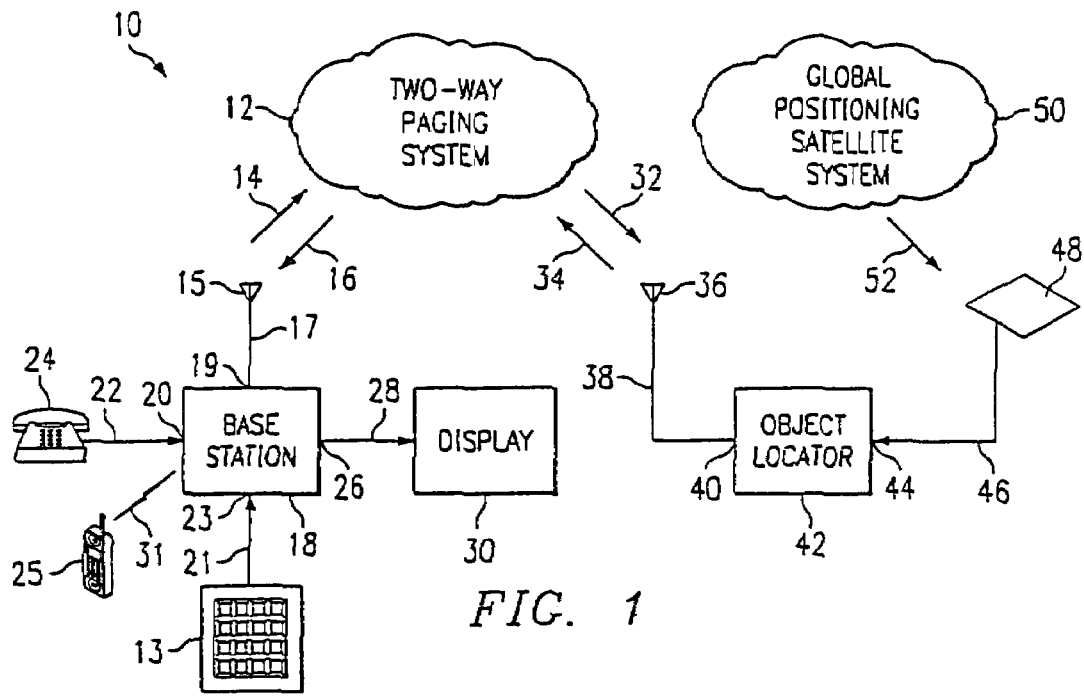
FIG. 1 illustrates a block diagram of an object locator system of the present disclosure.

Referring now to FIG. 1, there is illustrated a system block diagram of one embodiment of the object locator of the present disclosure. In FIG. 1, the object locator system 10 includes a two-way paging system 12, a satellite navigation system shown as a GPS system 50 and the object locator 42. While the described embodiment shows a GPS system for illustrative purposes, it is intended to function with other satellite navigation systems such as, for example, the Russian GLONASS system, which provide location information in the vicinity of the earth. The two-way paging system 12 is a conventional paging system that is well known in the art, for example, such as illustrated and described in U.S. Pat. No. 5,423,056 issued Jun. 6, 1995 to Lindquist, et al. and entitled ADAPTIVE CELLULAR PAGING SYSTEM, which patent is incorporated by reference herein in its entirety. The two-way paging system 12 interacts with a base station 18 over a transmit path 14 and a receive path 16. The base station 18, which may also be called a host, designating the position of a system user, may be a two-way pager and may include a telephone or a keyboard or the like or may have an input 20 for receiving a dialed-in telephone number from telephone set 24 along communications path 22 or from wireless telephone set 25 over communications path 31. The input 20 is responsive to dual tone multi-frequency (DTMF) tones transmitted by telephone set 24. The input 23 is responsive to digital signals transmitted over path 21 from a key array 13. Base station 18 further has an output 26 from which location data to be displayed travels along path 28 to display 30. Display 30 may be configured to display location information in any of several forms, for example, text, figures, graphics, or numbers.

Continuing with FIG. 1, the object locator system 10 of the present disclosure includes an object locator 42. In one of its operational modes, as a two-way paging transceiver, object locator 42 includes an input 40 coupled to an antenna 36 along cable 38 for receiving signals transmitted by two-way paging system 12 along path 32 and for transmitting paging signals to the two-way paging system 12 along path 34. The object locator 42 also includes an input 44 for receiving from a GPS system 50 location information signals along path 52 to be intercepted by antenna 48 and conducted to the object locator 42 along path 46 to input 44. The GPS system 50 is of a conventional design well known in the art, an example of which is described in U.S. Pat. No. 5,726,660 issued Mar. 10, 1998 to Purdy, et al. and entitled PERSONAL DATA COLLECTION AND RECORDING SYSTEM, which patent is hereby incorporated by reference herein in its entirety. Alternatively, location information signals may be received from the GLONASS satellite system or any other satellite navigation system providing location information by the use of a receiving system configured for such reception.

The resulting paging transmit signal is transmitted from port 19 to antenna 15 through path 17 and further transmitted along transmit path 14 to the two-way paging system 12. The two-way paging system 12 relays the paging message via transmit path 32 to the antenna 36 coupled to the object locator 42. As will be described in more detail hereinbelow, the object locator 42 processes the request for location information transmitted by base station 18, obtains location information from the global positioning satellite system 50 and transmits a response containing the location information from antenna 36 along path 34 to the two-way paging system 12 which, in turn, relays the location information signal along path 16 to antenna 15 of the base station 18 for processing and display on display 30. Multiple object locators 42 may be in individual communication with base station 18 by virtue of each object locator having a specific electronic address. Alternatively, each object locator 42 may be assigned multiple addresses. One address may be unique to the specific locator while at least one additional address may be identical for all locators communicating with the base station whereby the base station may send simultaneous messages to multiple object locators. Alternatively, wireless paths 14 and 16 along with antenna 15 may instead each comprise a standard telephone connection to a central office.

In another embodiment of FIG. 1, the base station 18 communicates directly over a wireless path with a compatible communications transceiver included in the object locator 42. Such a system is described further in conjunction with FIG. 11.

In another aspect of the invention, the object locator 42 is initialized by the user to define one or more geographic coordinates to define an area such as a yard. Only one position need be defined for a small area and only the corners of a large area need be defined, thus conserving memory requirements. The locator device is then attached to the animal. The object locator 42 is adapted to become operational when the object locator 42 device is secured to the animal and power is coupled to the object locator 42 thereby allowing reception of GPS location information. The object locator 42 may be set to monitor location signals continuously or periodically or selectively by a predetermined program. When the locating device and the animal pass a perimeter enclosing the defined area, the object locator 43 is activated to initiate a message to the base station 18 as will be described hereinbelow.

Figure 2:
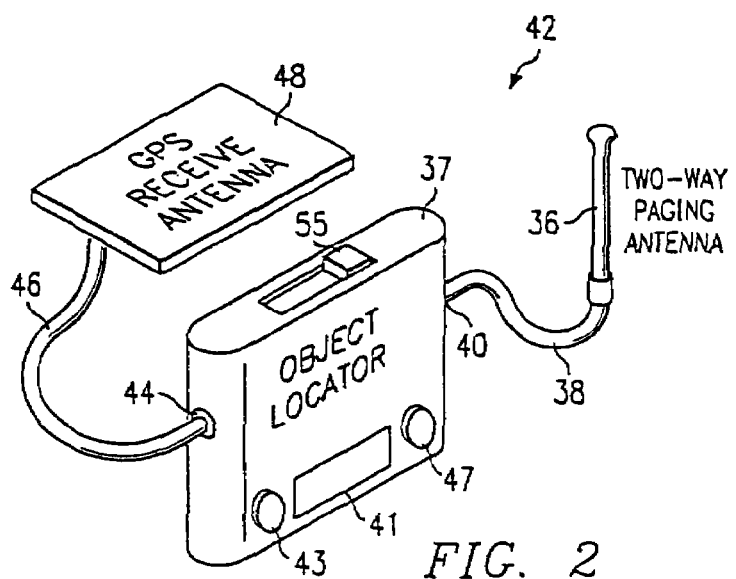
FIG. 2 illustrates a pictorial example of an object locator according to the present disclosure.

Referring now to FIG. 2, there is illustrated a pictorial drawing of an object locator 42 of the illustrative embodiment as it may be typically configured with a two-way paging antenna 36 and a GPS receive antenna 48. The two-way paging antenna 36 is coupled to the object locator package 37 along cable 38 to an input 40 on the object locator package 37. Similarly, the GPS receive antenna 48 is coupled along a cable 46 to an input 44 on the object locator package 37. The two-way paging antenna 36 shown in FIG.

2 is intended to represent the fact that this antenna in the object locator 42 is typically of the type found with two-way paging equipment. Such an antenna is typically mounted internal to the pager unit itself and is thereby necessarily of very small dimension. However, there may be applications of the object locator 42 of the present disclosure which may be optimized by the use of an external antenna such as shown in FIG. 2. Thus, the illustration of the two-way paging antenna 36 in FIG. 2 is not intended to be limiting, but merely illustrative. The GPS receive antenna 48 is conventionally referred to as a "patch antenna" because of its flat, thin, rectangular shaped design. Typically such a patch antenna is intended to be disposed on an upward, relatively level surface in order to expose it to receive the relatively weak signals transmitted by the global positioning satellite system 50 from the satellites arrayed in the GPS system 50. The illustration in FIG. 2 thus demonstrates that both of the antennae used in the system may be positioned for optimal reception and transmission and connected to the object locator package 37 using the flexible cables 38 and 46 respectively for the two-way paging antennae 36 and the GPS receive antenna 48. A switch 55 may be provided on the object locator 42 for activating or deactivating the object locator 42.

An alpha-numeric display 41 may be included on the object locator package 37 to allow information stored in memory 68 to be viewed. To conserve space, the display 41 may allow a limited number of characters to be viewed at one time. A readout control switch 47 associated with display 41 is operable to allow successive viewing of a sequence of data items or scrolling through lines of data. Similarly, a test button 43 is provided to allow the user to manually actuate object locator 42 to send a message to base station 18 thereby testing the communication links 34 and 16.

In use, the object locator 42 will likely be exposed to a variety of environmental conditions including exposure to water and temperature extremes. Accordingly, the package 37 containing the electronic circuitry should be resistant to water ingress to the electronic circuitry. The circuitry within the package should be designed for operation under wide temperature variations. Mechanisms for accomplishing such protection are well known in the art and will not be described here.

Figure 3A:
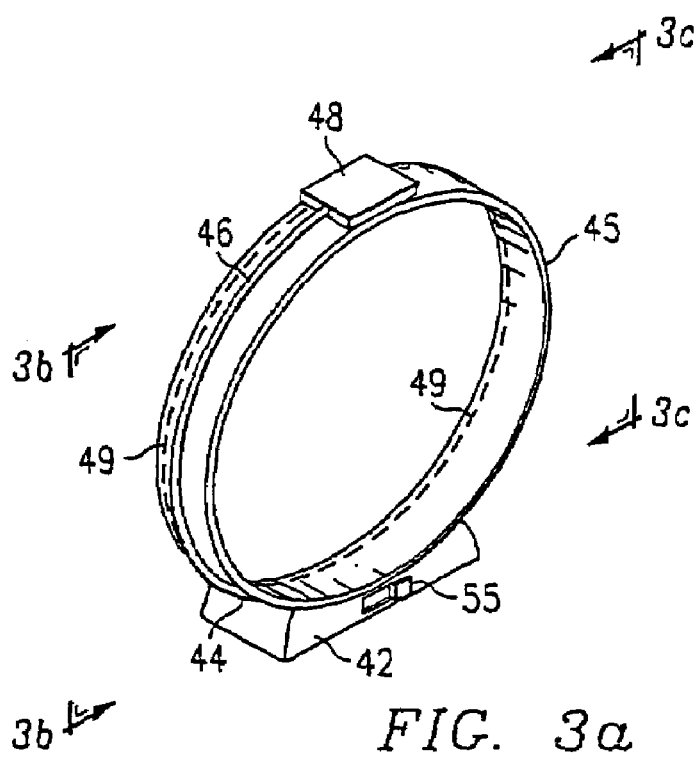
FIGS. 3a-3c illustrate a pictorial drawing of an object locator supported by a collar according to the present disclosure.
Figure 3B:
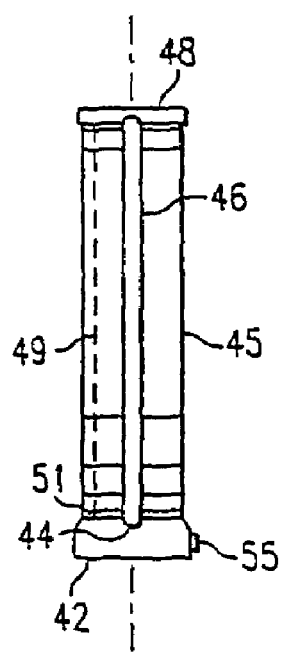
Figure 3C:
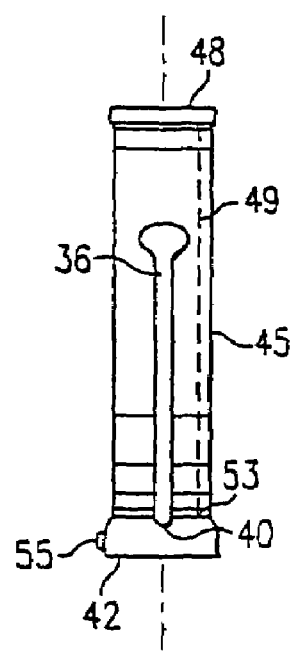

Referring now to FIGS. 3a, 3b and 3c, there is illustrated a pictorial drawing of an object locator 42 mounted on the lower side of a collar 45. Such a collar 45 is configured for supporting an object locator 42 around the body or neck of an animal which is intended to be tracked or located by the object locator 10 of the present disclosure. It will be observed that the GPS antenna 48 is attached to the collar diametrically opposite the position of the object locator. This is intentional as will be described hereinbelow. The object locator is coupled to the GPS antenna 48 through a cable 46 which connects to the input 44 of the object locator 42. This arrangement is illustrated in FIG. 3a and may be more clearly shown by looking at the cross section 3b-3b illustrated in FIG. 3b. In Section 3b-3b, a side view of the object locator mounted on a collar is shown wherein collar 45 supports the object locator 42 at its lower point and supports the GPS antenna 48 at its diametrically opposite upper point. As before, the GPS antenna 48 is coupled through cable 46 to input 44 of the object locator 42. Similarly, a side view identified by cross section 3c-3c in FIG. 3 c shows the opposite side of the collar-mounted object locator 42 assembly. In Section 3c-3c there is shown the collar 45 which supports the object locator 42 at its lower end and the patch antenna or GPS antenna 48 at its diametrically opposite upper end. Also shown in the Section 3c-3c is a representation of the two-way paging antenna 36 which is coupled to input 40 of the object locator 42. It will be appreciated that many configurations are possible for arranging or attaching the object locator and its antennae to the collar 45, including enclosing the GPS receive antenna 48 inside the collar 45 or consolidating the locator and antenna as a unit mounted on or in the collar. Alternatively, the locator and antenna may be distributively arranged on or in the collar. However, it will also be appreciated that the greater mass of the object locator 42 relative to the mass of the GPS antenna 48 and the fact that they are mounted on diametrically opposite sides of the collar 45 enables the object locator 42 to remain in the lowest possible position while the GPS receiving antenna remains in the highest possible position to optimize the reception from the GPS system 50, though it is not imperative that the GPS antenna 48 remain in the highest possible position in alternative embodiments, the GPS antenna 48 may be positioned within or around the collar 45 or integrated with the pager antenna 36.

Continuing with FIGS. 3a-3c, a mechanism such as a clasp or buckle arrangement (not shown in FIGS. 3a-3c) may be provided to permit the collar 45 to be opened and closed for securing the collar around the neck or body of the animal to be tracked or located. Such clasp or buckle may be electrically integrated with the collar and the electronic circuitry, e.g. constructed with an interlock, such that initial mating of the clasp or buckle will activate operation of the object locator 42. Any subsequent opening of the clasp or buckle may initiate an alarm message to the base station indicating deactivation of the object locator 42 except when a message sent to the object locator 42 by the base station 18 caused a previous, intentional deactivation. In an alternate embodiment the object locator 42 may be deactivated by a signal from the base station 18, allowing the collar 45 to be removed without causing an alarm indication. In another embodiment, a collar activating switch 55 may be imbedded in the collar 45 or located on the object locator 42 attached to the collar 45. A security device 49, preferably a flexible metal cable represented by the dashed line in FIGS. 3a, 3b arid 3c, which is coupled electrically to the buckle or clasp and through ports 51 and 53 to object locator 42, provides a closed electrical circuit when the clasp or buckle of the collar 45 closed. Cutting or otherwise breaking security device 49 will cause object locator 42 to immediately initiate a preformatted message alerting the user of the security break. The object locator 42 may also be activated upon closing the clasp or buckle when placing the collar 45 around the body of the animal or other object to be tracked or located. A manual test of the communication link 34 and 16 between the object locator 42 and the base station 18 may be actuated by manually operated switch 43. To perform the test, actuation of switch 43 causes the controller to send a preformatted message stored in memory 68 within the object locator 42 over communication link 34 and 16 to the base station 18. The features described hereinabove are intended to be illustrative and many configurations are possible that will be apparent to those skilled in the art.

Figure 4:
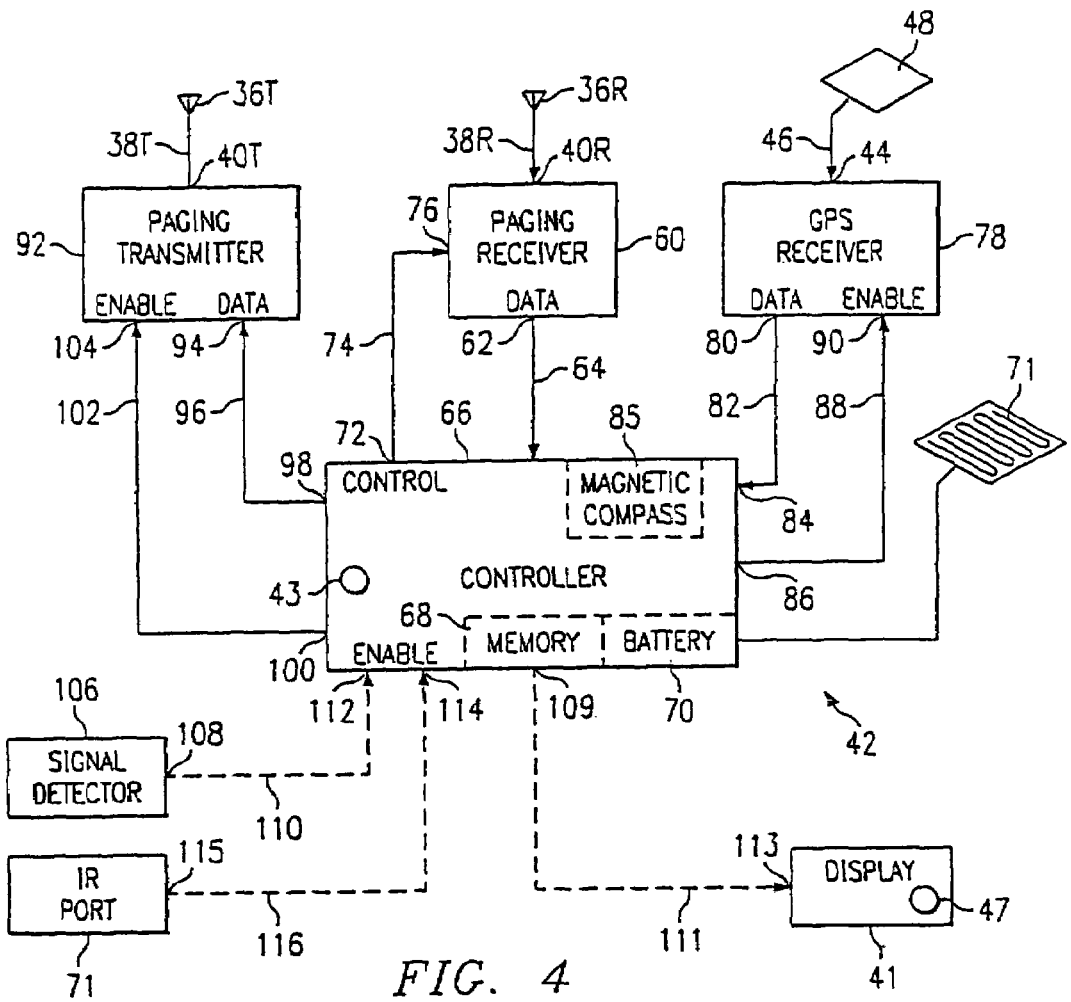
FIG. 4 illustrates a block diagram of the object locator of the present disclosure.

Referring now to FIG. 4, there is illustrated a block diagram for the object locator 42 of the object locator system 10 of the present disclosure. A paging receiver 60 is shown coupling a data output 62 along path 64 to an input of controller 66. Controller 66 includes a memory 68 for the storage of location data and a battery 70 for powering the object locator 42. This battery 70 is, in the present disclosure, a rechargeable battery. This battery 70 can be a NiCad battery, a Lithium battery or any rechargeable battery, though one-use batteries may also be used. A solar cell 71 and associated charging circuitry (not shown) is provided for charging the battery 70. Controller 66 includes a control output 72 which is coupled along path 74 to a control input 76 of paging receiver 60. Paging receiver 60 receives paging communications via antenna 36R which are coupled along cable 38R to RF input 40R of paging receiver 60.

Continuing with FIG. 4, there is shown a GPS receiver 78 for which provision is made to couple location data at an output 80 along path 82 to an input terminal 84 of controller 66. GPS receiver 7 further includes an enable input which is coupled from controller 66 at output 86 along path 88 to the enable input 90 of the GPS receiver 78. The GPS receiver 78 receives GPS signals from the global positioning satellite system 50 at antenna 48 which signals are coupled along path 46 to RF input 44 of the GPS receiver 78.

Further illustrated in FIG. 4 is a paging transmitter 92 which is configured to transmit the location data provided by controller 66 at output 98 along path 96 to the data input 94 of paging transmitter 92. Controller 66 also provides an enable output at output 100 along path 102 to the enable input 104 of paging transmitter 92. The paging transmitter 92, when enabled, transmits data received at the data input 94 and couples the signal to be transmitted from the output terminal 401 along path 38T to the paging transmitter antenna 361 for radiation to the two-way paging system 12. It will be appreciated that the paging system components, while shown as separate functional elements in FIG. 4, may in fact be integrated into a single two-way paging transceiver which share a common antenna represented by reference number 36. The illustration shown in FIG. 4 is intended to provide clarity as to the signal paths that operate during the communication relationship of the object locator 42 with the two-way paging system 12. A number of configurations for coupling the antenna to the paging transceiver are feasible, are well known in the art and will not be described further herein.

Continuing with FIG. 4, there is shown a block labeled "signal detector" 106 having an output 108 which is coupled along path 110 to an enable input 112 of controller 66. The signal detector 106 represents any of several optional devices which may enable the more precise control of the object locator 42 by limiting the operation of the object locator 42 to certain external conditions outside the paging communications or the GPS reception areas by the object locator 42. In the illustrative example shown in FIG. 4, the signal detector 106 provides an output whenever a threshold is crossed by signal energy received from an independent source, e.g., a beacon. This threshold may represent a predetermined perimeter beyond which the object locator 42 is enabled to operate and within which a position of the object locator would probably provide no useful information because the object locator may be within line of sight to the base station. Other thresholds may be expressed in terms of time or altitude or as an azimuth heading or simply an area defined by the uncertainty statistics of the position reported by GPS. Alternatively, the object locator 42 may be programmed for operating an alarm or automatically transmitting location information to a base station when the object locator 42 moves outside a perimeter. Such perimeter may be programmed by physically positioning the object locator 42 at extremes of an area and, while the GPS receiver 78 is operating, storing in the object locator's memory 68 the coordinates reported, thus establishing a boundary outside of which the object locator 42 will automatically report a position. Additionally, the perimeter may be defined by at least one coordinate stored in the object locator memory 68. The perimeter is then determined by selecting stored algorithms to define the limits of a circular or other geometrical shape outside of which the object locator 42 will automatically report a position.

For example, the coordinate positions of the corners of a rectangular area may be obtained and stored. Each such position is an origin or center of a circle, the circle representing the GPS system error (position uncertainty, specified as a radius) of the location data provided by the GPS system 50. The enclosed area is defined by establishing straight lines tangent to the outer arcs of each adjacent pair of circles along the intended area border. In a typical GPS system of current technology, the radius of the circle may be, for example, approximately 5 meters (or a little over 16 feet) for civilian applications. Thus, to specify a square area with sides approximately 25 meters apart (or about 80 feet) a user would position the object locator at the corners of the square located about 15 meters (about 48 feet) apart. Many other algorithms for specifying an enclosed area are of course possible. In another example, in some cases a circle of radius of 5 meters, equivalent to an enclosed, circular area of diameter equal to 10 meters may be appropriate. In such a case, a single coordinate position would suffice to specify the enclosed area, beyond which the object locator 42, upon activation, automatically obtains location: of its current position outside the perimeter of the specified circle and reports it to the base station. The base station, in these examples, may simply be a pocket display pager carried by a user who may be within a specified circle (e.g., at the origin) or at some other location or even in motion with respect to the origin where the enclosed area is specified or with respect to the object locator.

Continuing with FIG. 4, it will be appreciated that each of the major functional blocks shown in FIG. 4 may be implemented singly or collectively into integrated circuit structure which may be configured to fit within a housing of very small dimensions. For example, a pocket pager that typically occupies a volume of approximately three to five cubic inches may weigh approximately four to six ounces. In a preferred embodiment, the GPS receiver 78, the controller 66, the paging transmitter 92 and the paging receiver 60 may be integrated into a single integrated circuit structure. The controller 66 may comprise a single chip microprocessor or microcontroller or digital signal processor which may be programmed to provide a variety of functions and operational features. Such programs may be stored in memory 68 for use by the controller 66 in controlling the operation of the object locator 42. The paging receiver 60, the paging transmitter 92 and the GPS receiver 78, while shown as functional blocks, in reality, each may have a number of complex functions incorporated therein. Thus, many configurations and functional operations are possible within the scope of the block diagram illustrated in FIG. 4. The detailed description which follows will illustratively provide descriptions of some of the basic operational features of the object locator system 10 of the present disclosure. One such feature represented by the signal detector block 106 will be described hereinbelow in conjunction with FIG. 7.

Figure 5:
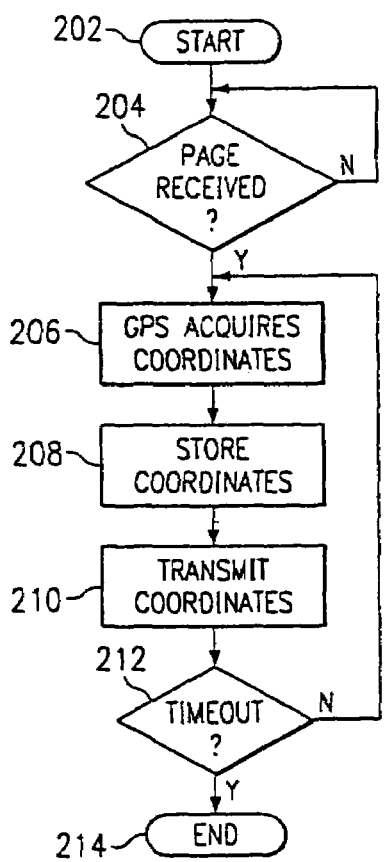
FIG. 5 illustrates a flowchart of the operation of the object locator generally.

Referring now to FIG. 5, there is illustrated a flowchart for the operation of the object locator 42 shown in FIG. 4 in the case where the user desires to determine the location of the object locator 42. This circumstance may represent any number of user activities including an owner's efforts to determine the location of a pet dog or a pet cat, for example. Similarly, the operation illustrated in FIG. 5 may also include a situation where an owner desires to track versus time, an object to which the object locator 42 is attached. Further, the flowchart of FIG. 5 may also illustrate the situation when the object locator 42 is attached to a person and it is desired to know the location of that person at some particular time or some other previous time as further described below. The flow begins at block 202 with the start of the sequence of operations, which is followed by decision block 204 in which the object locator 42 seeks to determine whether a page requesting location information has been received by the input 40 of the two-way paging receiver 60. If the result of this determination is in the negative, then the flow returns to the input of the decision block for a retry. If, however, the result of the query was affirmative, then the flow proceeds to block 206 in which the GPS receiver 78 is enabled to acquire the location coordinates of the object locator 42 by receiving signals from the global positioning satellite system 50 illustrated in FIG. 1.

Upon successfully acquiring the coordinates of the object locator 42 and thus of the individual object or animal to which the object locator 42 is attached, the object locator 42 then operates to store the coordinate information in block 208 by loading the coordinate information into the memory 68 of the controller 66 in the object locator 42. Such coordinate information may be associated with a time stamp. Such time stamp, derived from the GPS satellite system, may then be stored in block 208 for later retrieval. Additionally, such coordinate information may further be associated with other data such as object locator 42 operational status or battery condition. The flow then proceeds from block 208, where the coordinates were stored in the memory 68, to block 210, wherein the object locator 42 is configured to transmit the coordinates in response to the request received over the two-way paging system 12. The transmission of coordinates will occur in the opposite direction utilizing the same two-way paging system 12 over which the request for location coordinates was received in block 204. Following the transmission of the coordinates in block 210, the flow proceeds to a timer block 212 which provides a measured interval of time during which the object locator 42 attempts to acquire the coordinates at the particular time from the GPS system 50. It is well known that a typical GPS system often takes a substantial amount of time to acquire location coordinate information from a sufficient number of satellites in order to fix the location of the object locator 42 with a sufficient degree of precision. The time required involves receiving several signals under conditions which may vary widely from instant to instant, which impairs the ability of the GPS receiver 78 as shown in FIG. 4 to obtain complete location data to respond to the request received by the paging receiver 60 in the object locator 42. The time value represented by the timer operating in block 212 may be on the order of five to ten minutes, for example. In block 212, if the timer has not reached the time-out value, then the flow returns to the input of block 206 where the object locator 42 again attempts to acquire the coordinates from the GPS system 50. Returning to block 212, if the timer has reached its end value, then the flow proceeds from block 212 to block 214 where the routine ends. FIG. 5 thus illustrates a basic mode of operation of the object locator 42. It will be appreciated that many variations on this basic operating mode are possible and may be used to enhance the operation of the object locator 42. Such features may be programmed into the controller 66 of the object locator 42.

Figure 6:
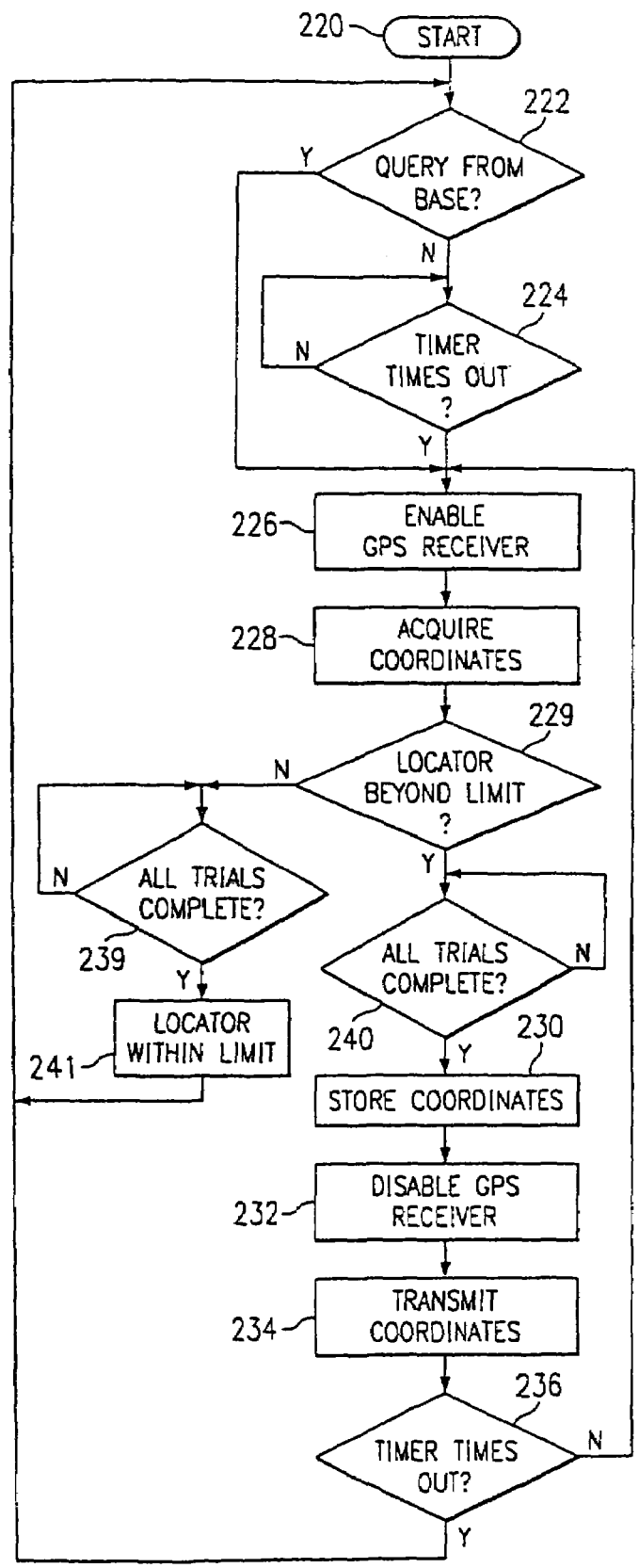
FIG. 6 illustrates a flowchart of the operation of the object locator subject to an additional external control.

Referring now to FIG. 6, there is illustrated a flowchart for the operation of the object locator 42 in the circumstance where it is activated, in this illustrative example, to obtain location information from the GPS receiver 78 and transmit coordinates only when the object locator 42 is in a position beyond a distance limit defining a designated area surrounding or relative to the base station or some other defined location such as an origin from which the request for location coordinates was initiated. The object locator is activated to transmit location coordinates when it is secured to the object, power is coupled to the object locator and the object locator passes the perimeter of a defined enclosed area. The object locator may also be activated to transmit location coordinates by remote command or query from a base station or periodically by a timer in the object locator controller. The flowchart in FIG. 6 also shows additional steps in the operational sequence which may be used to enable and disable the GPS receiver 78 within the object locator 42. As was pointed out previously, the GPS receiver 78 is typically a device which requires substantial electrical power to operate. It is prudent to minimize the power drawn from the object locator battery 70 in FIG. 4 by limiting the operating cycle of the GPS receiver 78. The GPS receiver 78 in this example is permitted to become operational only long enough to obtain the coordinate information that is required by the object locator 42.

Continuing with the flowchart of FIG. 6, the flow proceeds from start block 220 to a decision block 222 to determine whether the object locator 42 has received a query from the base station 18. If a query has not been received, such as occurs during an automatic mode or by command, the flow proceeds along the "N" path to a timer block 224 wherein the object locator 42 may operate a timed sequence to periodically enable the GPS receiver 78 to acquire location coordinates whether or not a query is received from the base station 18. When the timer of block 224 times out, the flow proceeds along the 'Y' path to a block 226 to enable the GPS receiver 78. Returning to decision block, 222, if the object locator 42 did receive a query or command from the base station 18, the automatic mode is overriden and the flow proceeds along the 'Y' path to block 226 to enable the GPS receiver 78.

Continuing with FIG. 6, the flow in the object locator 42 proceeds from block 226 to block 228 to acquire the coordinates of the location of the object locator 42. Thereafter, the flow proceeds to decision block 229 to determine whether the object locator 42 is beyond a predetermined perimeter with respect to the base station 18 or other origin location which defines a designated area. In this illustrative example, the designated enclosed area surrounding the base station 18 or origin defines an area in which operation of the object locator 42 is inhibited because the object having the object locator 42 attached thereto is in the immediate vicinity of the base station 18 or is within the radius of uncertainty with respect to the origin as described hereinabove. Beyond the designated enclosed area the object locator 42 automatically reports location data to the base station 18. The predetermined perimeter distance limit or radius may typically be set, for example, to approximate the boundary of the residence of the owner of a pet animal, beyond which it is desired to obtain location information of the pet animal provided by an object locator 42 (or, pet locator 42 in this example) attached to the pet. If the result of the determination in block 229 is negative, the flow proceeds along the "N" path to decision block 239 wherein a counter provides for a predetermined number of trials to establish whether the object locator 42 is beyond the predetermined limit required in block 229. When the counter in block 239 completes the last count, the flow proceeds to a block 241 when the object locator 42 outputs a preformatted message to the base station 18 that the object locator is still within the predetermined limit. Therefrom, the flow proceeds along the "Y" path to the input of the decision block. Returning now to decision block 229, if it is determined that the object locator 42 is beyond the predetermined limit, meaning the coordinates are to be stored, the flow proceeds along the "Y" path to block 240 wherein a counter provides for a predetermined number of trials to establish whether the object locator 42 is beyond the predetermined limit required in block 229. When the counter in block 240 completes the last count, the flow proceeds to block 230 to store and, in some cases, time stamp the location coordinates acquired from the GPS satellite during the step performed in block 228. As before, the enable signal applied to the enable terminal 90 operates to awaken the GPS receiver 78 so that it may communicate with the GPS system and obtain location information coordinates for the object locator 42. The flow proceeds from block 226 where the GPS receiver 78 is enabled to a block 228 where the object locator 42 acquires the coordinate information from the global positioning satellite system 50.

Continuing with FIG. 6, upon acquiring the coordinates of the object locator 42 from the GPS receiver 78, the controller 66 within the object locator 42 causes the location and time information to be stored in the memory 68 of the object locator 42 in the operational block 230 of FIG. 6. The flow then proceeds to a block 232 where the controller 66 operates to disable the GPS receiver 78 such that it will no longer continue to drain power from the battery, until the next time that it is desired to acquire coordinate information from the GPS system 50. Following the disabling of the GPS receiver 78 in block 232, the flow proceeds to a block 234 wherein the object locator 42 provides the location data on output terminal 98 along path 96 to the data input 94 of the paging transmitter 92. The location information is then transmitted via the two-way paging system 12 to the base station 18 shown in FIG. 1. The flow proceeds from block 234 following the transmission of the coordinate information to a time-out block 236 where a timer provides an interval of time in which the object locator 42 is permitted to acquire the coordinate information from the GPS system, thus maximizing the opportunity to acquire the coordinates before the object locator 42 becomes inactive. Here the time-out value may again typically be on the order of five to ten minutes, although the time duration may legitimately be any value that corresponds with the particular circumstances of use and, in fact, may be adjustable in some applications. In the event that the time-out value has not been reached in block 236, the operation loops back around to the input of block 226 and enables the object locator 42 to continue attempting to acquire the location information from the GPS system. In the event that the time-out value has been reached, then the flow proceeds along the "Y" path from block 236 back to the start of the sequence at the input to the decision block 222 where the object locator 42 is enabled to check whether the object locator 42 is positioned beyond the predetermined limit as previously explained.

Figure 6A:
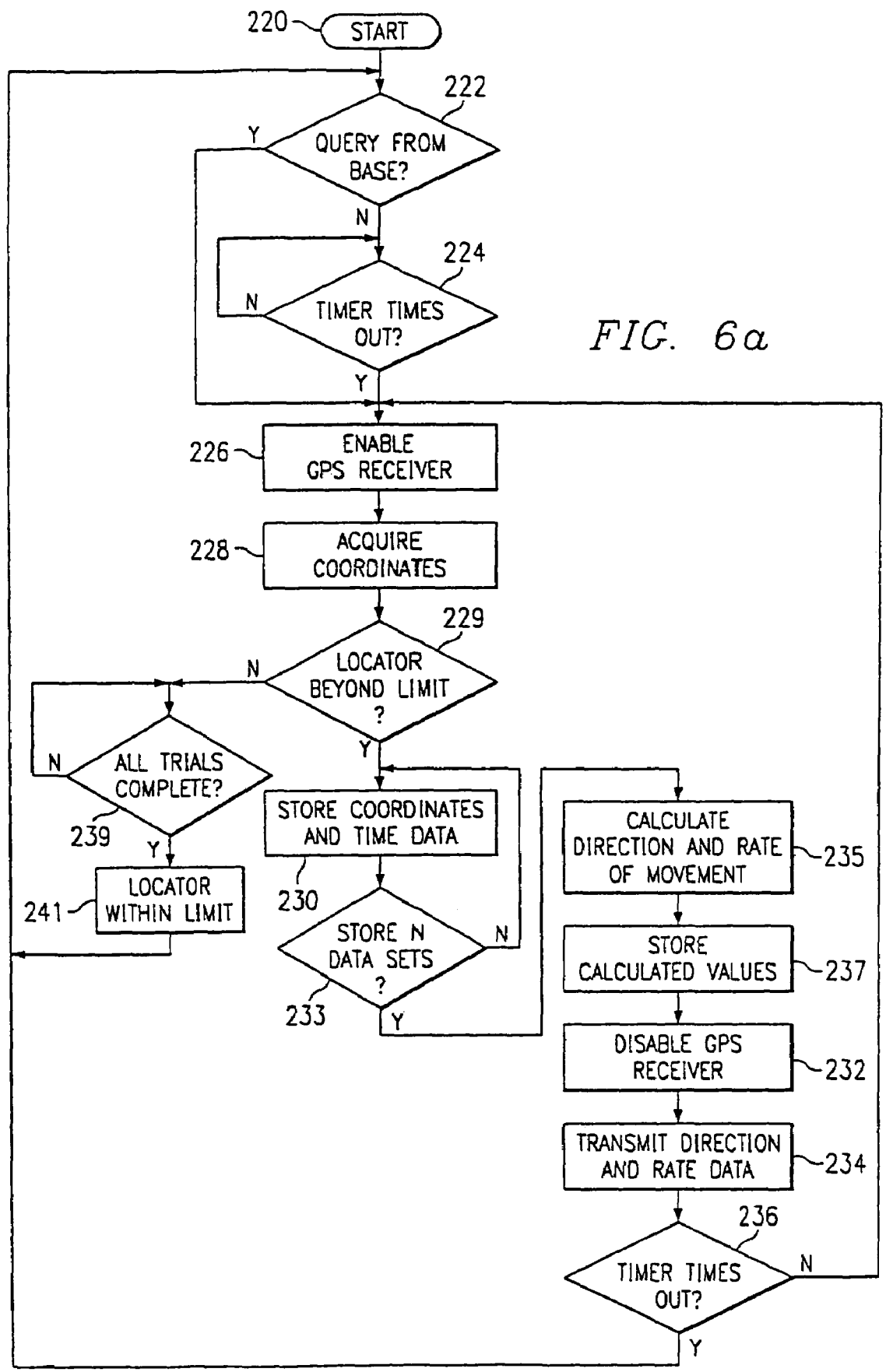
FIG. 6a illustrates the operation of an alternate embodiment of the object locator of FIG. 6.

Referring now to FIG. 6a, there is illustrated a block diagram of a configuration that enables reporting the direction and rate of movement of the object to which collar 45 is attached. This embodiment is very similar to that shown in FIG. 6 and shares functional blocks which have the same function and reference numbers with FIG. 6. Upon acquiring the coordinates of the object locator 42 from the GPS receiver 78, the controller 66 within the object locator 42 causes the location and time information to be stored in memory 68 of the object locator 42 in the operational block 230 of FIG. 6a. The operational flow described in FIG. 6a illustrates the operation in the case where the object locator is beyond the limit previously set as described hereinabove for FIG. 6. Once an out of limit message is sent from the object locator 42 to the base station 18, the user may desire to know the direction and rate of movement of the object locator 42. Determination of the direction and rate requires analysis of a sequence of information containing position coordinates and the time at which each set of coordinate data were collected. In order for the calculation to be accurate and timely, the data must be current. Accordingly, the user may cause a message to be sent from the base station 18 to the object locator 42 to designate the number, N, of coordinate and time data sets to be taken and used in the calculation of the direction and rate of movement of the object locator 42. When the object locator 42 receives the previously described message from the base station 18, the flow described in FIG. 6a begins at start block 220.

The flow in FIG. 6a begins with start block 220 wherein a preformatted message indicating the number, N, of required samples of location and rate of movement data is sent from the base station 18 to the object locator 42. In this case, the GPS receiver is enabled at block 226 and begins to acquire coordinates in block 228. Since the object locator 42 in this illustrative example is already beyond the predetermined limit the decision block 229 passes the flow to block 230. The flow then proceeds to a decision block 233 wherein a counter provides for a predetermined number, N, of coordinate and time data sets to be stored and saved in memory 68. The minimum required number of coordinate and time data sets to make a calculation of direction and rate of movement, of course, is two. However, in many cases a greater value for N may provide more accurate, timely results. When the counter of block 233 reaches the predetermined value of N that is required, the flow proceeds to block 235 wherein data previously collected and stored in memory 68 is accessed and processed to determine the direction and rate of movement of the object locator 42 and then, flowing to block 237, the resulting direction and rate calculations are stored in memory 68. The flow then proceeds to block 232 where the controller 66 operates to disable the GPS receiver 78. Following the disabling of the GPS receiver 78 in block 232, the flow proceeds to block 234 wherein the object locator 42 provides the direction and rate of movement data on output terminal 98 along path 96 to the data input 94 of the paging transmitter 92. The direction and rate of movement information is then transmitted via the two way paging system 12 to the base station 18 shown in FIG. 1. Messages reporting direction of movement are preformatted to transmit a symbol, such as an arrow, representing the direction of motion of the object locator in addition to alpha-numeric characters showing location.

Figure 6B:
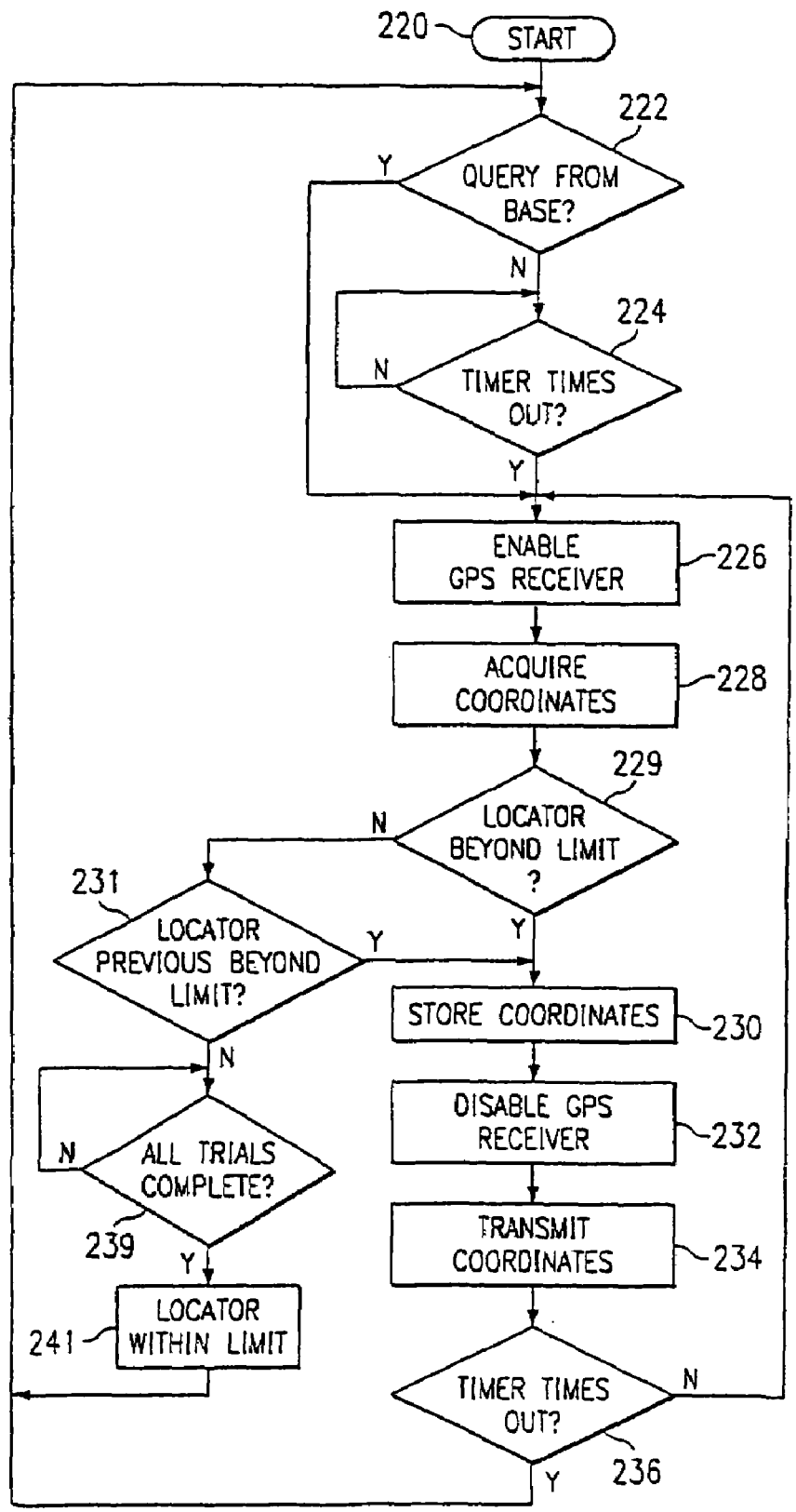
FIG. 6b illustrates the operation of another alternate embodiment of the object locator of FIG. 6.

Referring now to FIG. 6b, there is illustrated a flow chart to provide for reporting the return of the object locator 42 to within the predetermined limit after initially going beyond the limit. This embodiment is very similar to that shown in FIG. 6 and shows functional block which have the same functions and reference numbers—with FIG. 6. Upon either a base station query or a timed sequence (or duty cycle) query, decision block 229 outputs a negative result when the object locator 42 is now within the predetermined limit. The flow proceeds to decision block 231 to determine whether the object location 42 has previously been beyond the limit. If the result is affirmative, the flow proceeds to blocks 230, 232 and 234 wherein the object locator 42 reports, via a preformatted message retrieved from memory 68, to the base station 18 that the object locator 42 is now within the predetermined limits, i.e., the pet animal or object has returned close to the base station. The report may be indicated at the base station 18 by a symbol or other characters associated with the information. If, however, the determination is made that the object locator was not previously beyond the predetermined limit, the flow proceeds along the N path to the block 239, the counter which regulates the number of trials for recognizing a beyond limit condition. Upon reaching the predetermined count in block 239 the flow proceeds to block 241 where a message "object locator is still within the limit" is issued to the base station 18.

In describing the use of the object locator 42 there are defined four concentric geographic regions. In the center is the immediate vicinity of the base station 18 or near range which may, for example, be roughly equivalent to the residential yard of the owner of a pet that wears an object locator. Next is the active range of the object locator 42, separated from the near range by a predetermined inside perimeter or limit. Just beyond the outer portion of the active range, bordered by an outside perimeter defined by a weak, predetermined signal, is the outer range within which the object locator operation is marginally capable of reliably providing location information. The report to the base station 18 of locations within this outer range may be accompanied by a preformatted message specific to this circumstance. For example, such a message in this instance might state: "The last known position and heading (of the object or pet) is" followed by the coordinates and information about the heading. The last geographic region, beyond the outer range and defined by the loss of signal from the base station 18, is the far range, where the object locator is unable to provide location information. Of primary interest then, are the predetermined inside perimeter limit and the predetermined outside perimeter limit, between which lies the active, reliable range of the object locator. The inside perimeter will depend, in general, upon the resolution parameters of the GPS system 50. The outside perimeter may, generally, be defined by a signal strength parameter such as the reception strength of a beacon signal.

Figure 7:
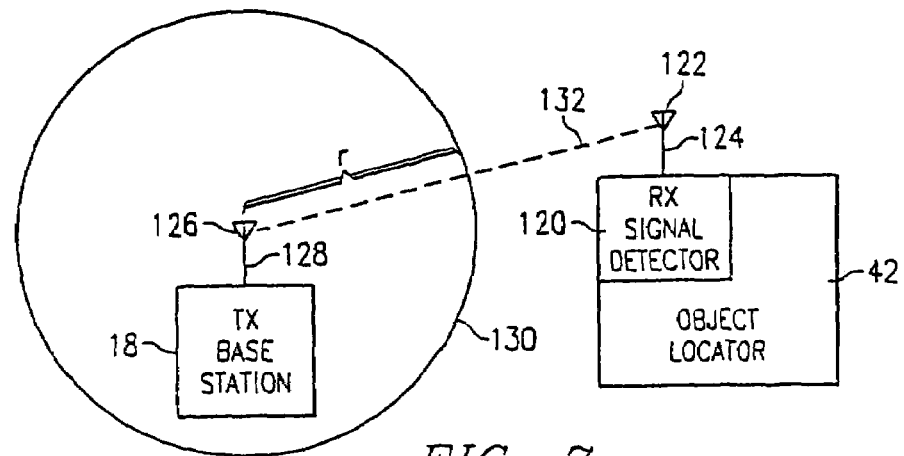
FIG. 7 illustrates a pictorial drawing of a range dependent enablement system used to provide external control for the object locator.

Referring now to FIG. 7, there is illustrated a pictorial block diagram of one configuration for providing a predetermined limit signal to the object locator 42. Shown in FIG. 7 is a base station 18 coupled with its antenna 126 through a cable 128 and operating to produce a signal which is radiated according to the radiation pattern characteristic of the antenna 126 of the base station. Also shown in FIG. 7 is an object locator 42 which includes a signal detector block 120 coupled to an antenna 122 through a cable 124. It will be noted that the base station 18 is operating in a transmit mode and the object locator 42 is operating in a receive mode via antenna 122. The object locator 42, by comparing, the received signal strength of the signal transmitted by the base station from antenna 126 with a reference signal stored within the signal detector 120, may determine whether it is near or far from the base station 18. It is presumed in this example that the signal strength measured between the base station 18 and the object locator 42 falls off in a predictable manner as compared with the distance that separates the object locator 42 from the base station 18. It will be appreciated that this technique may be used to define a predetermined inside perimeter limit signal that defines when (or where) the object locator is to begin providing location information as the animal or object wearing the object locator 42 moves away from the base station 18. This technique may also be used to indicate when the object locator has moved or is moving—past an outside perimeter, beyond the useful range of the object locator 42.

Continuing with FIG. 7, an alternative to comparing the limit signal with a reference value is to simply utilize the signal-to-noise characteristics of the receiver in the object locator 42. When it is no longer possible to acquire or capture the signal from the base station 18, a limit is thereby provided. The limit may be adjusted simply by adjusting the base station signal strength. By way of illustration, a predetermined limit may thus be established by controlling the signal strength of the base station 18 signal such that at an imaginary boundary 130 such as a predetermined outside perimeter surrounding base station 18 is defined. The signal strength is of a sufficiently low value which can just be detected by the signal detector 120 in the object locator 42 at the imaginary boundary 130. Thus, if the object locator 42 antenna 122 is greater than a distance indicated by the radius "r" from the base station 18, then no signal will be detected (or it will be below an acceptable threshold) and the object locator 42 is presumed to be beyond the predetermined outside perimeter limit represented by the distance "r", which may also be thought of as an acceptance radius. If, however, the object locator 42 receives or detects the signal emitted by the base station 18 (or it is above the predetermined threshold), then it is presumed that the antenna 122 of the object locator 42 is within the radius "r" and the object locator 42 may, at that point, be activated to acquire location information from the GPS system 50 and report it to the base station 18.

Figure 8:
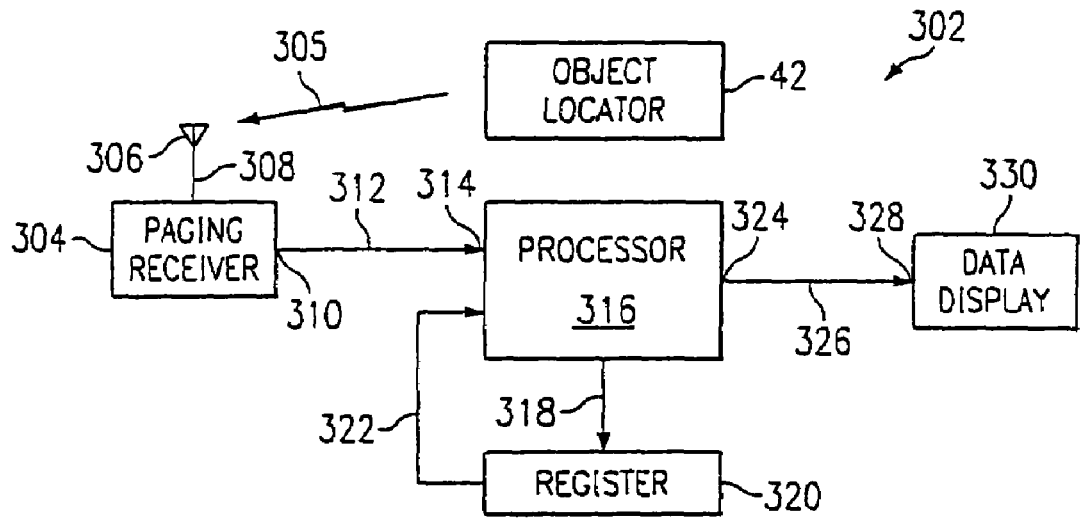
FIG. 8 illustrates a block diagram of a base station that may be used with the object locator of the present disclosure.

Referring now to FIG. 8, there is illustrated a block diagram including features which may be implemented in the base station 18 to process the location information received from the object locator 42 over path 305. In the one embodiment shown in FIG. 8, the base station 302 includes a paging receiver 304 which has a receiving antenna 306 coupled to the paging receiver 304 by a cable 308. The output of paging receiver 304 is supplied at an output 310 along path 312 to an input 314 of a processor 316 which receives and processes the location information for output or display. In the illustrative example of FIG. 8, the information is stored along a path 318 in a register 320 from which the information can be retrieved along path 322 by the processor 316 for output at terminal 324 along path 326 to the input 328 of a data display 330. In this simple example illustrated by the block diagram of FIG. 8, the location information is processed for display as data which may be in the form of degrees of longitude and latitude, the names of the closest major street intersections or in terms of polar coordinates such as an azimuth heading and a distance between the base station 302 and the object locator 42.

Figure 9:
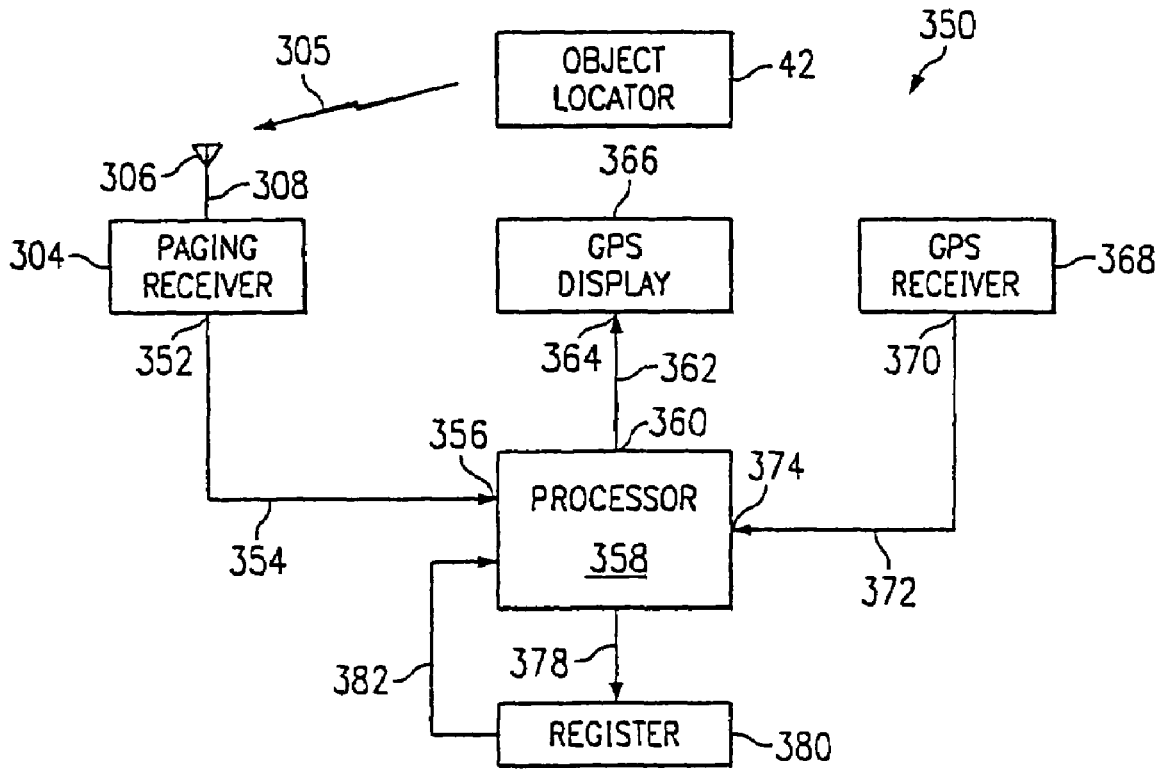
FIG. 9 illustrates a block diagram of an alternate embodiment of a base station that may be used with the object locator of the present disclosure.

Referring now to FIG. 9, there is illustrated an alternate embodiment showing a base station 350 which includes a paging receiver 304. Paging receiver 304 receives location information transmitted by object locator 42 over path 305 to the antenna 306 of the paging receiver 304 along cable 308. Paging receiver 304 is coupled from an output 352 along path 354 to an input 356 of processor 358 in the base station 350. Processor 358 may also have access to a register 380 along path 378 from which the processor 358 may further obtain stored location information along path 382 from register 380. Such location information is, of course, available from the GPS receiver 368 which is coupled at an output 370 along path 372 to an input 374 to processor 358. This GPS receiver 368 is part of base station 350 and enables the base station 350 to provide an enhanced display of the location information obtained from the object locator 42.

Continuing with FIG. 9, there is shown a GPS display 366 that obtains data concerning the location coordinates from processor 358 at an output 360 which flows along path 362 to an input to the GPS display 366 at input 364. The GPS display 366 is configured to provide a map of the area that includes both the base station 350 and the object locator 42, and thus display the relative position of each component of the object locator system 10 with respect to the other. As is typical with GPS display units, a map may be shown with streets or thoroughfares indicated thereon and indicia included in the display showing the respective location of the base station 350 and of the object locator 42.

Figure 10:
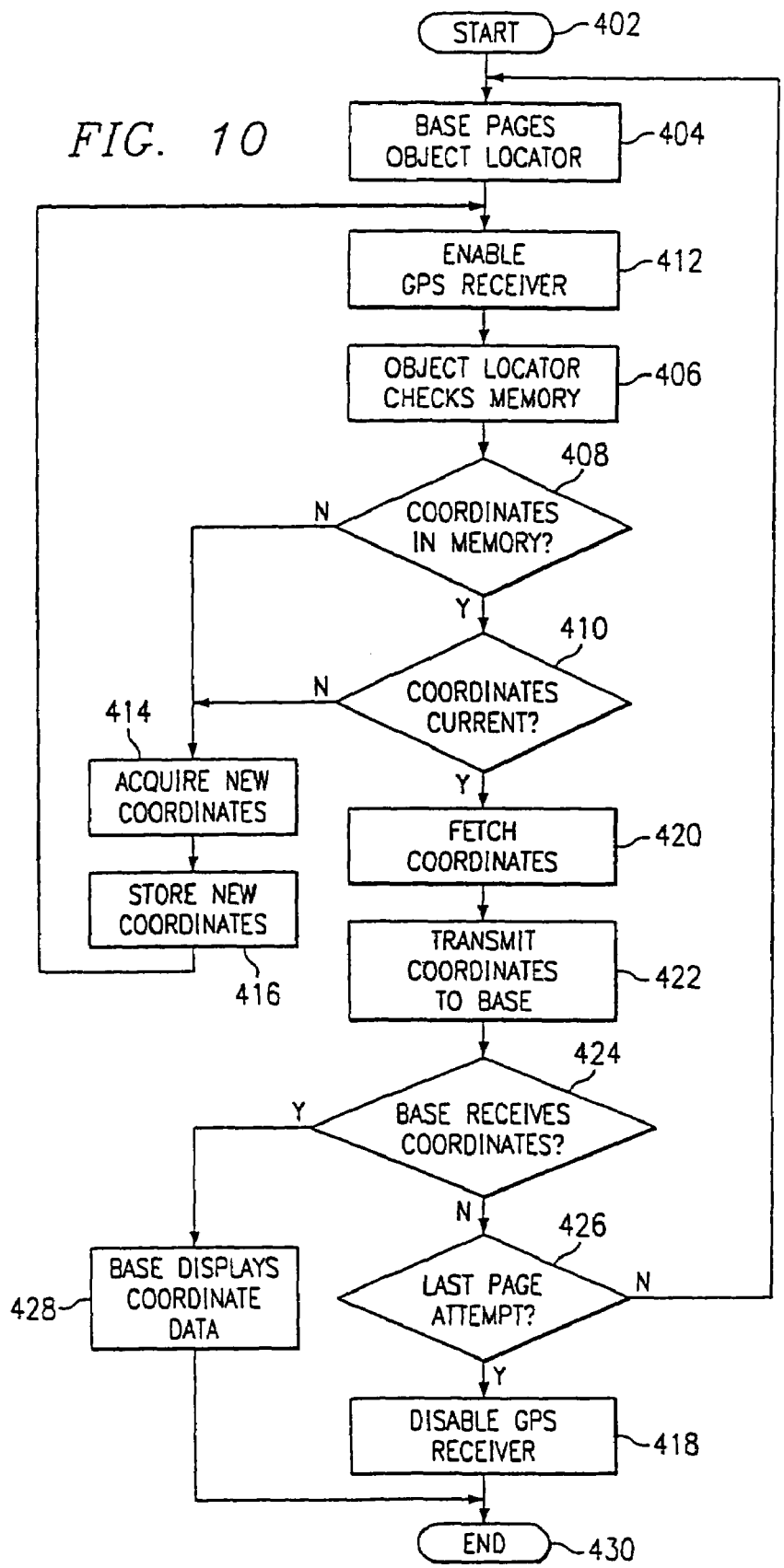
FIG. 10 illustrates a flowchart of the operation of the object locator system of the present disclosure in obtaining location data via two-way paging.

Referring now to FIG. 10, there is shown a flowchart of the operation of the combined units of the object locator system 10 of the present disclosure as illustrated in FIG. 1. The flow begins at block 402 where the routine starts and thereupon flows to a block 404 in which the base station 18 requests location information by paging the object locator 42. In this block 404, the base station 18 transmits a request for location information to the object locator 42. The flow proceeds from block 404 to block 412 where the object locator 42 proceeds through the sequence to enable the GPS receiver 78 in order to obtain new location coordinate information. Thereupon the flow proceeds to a block 406 wherein the object locator 42 checks its own memory see, for example, the block diagram of the object locator 42 shown in FIG. 4 whereupon the flow proceeds to block 408 where the object locator 42 determines whether, in fact, there are coordinates in its memory. If the result is in the affirmative, then the flow proceeds along the "Y" path to a block 410 where a determination is made by the object locator 42 whether the coordinates stored in its memory are current. If the result in block 410 is affirmative, then the flow proceeds along the "Y" path to a block 420 where the object locator 42 will fetch the coordinate information from its memory 68 shown in FIG. 4 and set up the object locator 42 to transmit the coordinates to the base station in a block 422. Thereupon the flow proceeds to a block 424 wherein the base station 18 makes a determination as to whether it has received the requested coordinate information from the object locator 42. If the result is affirmative, then the flow proceeds along the "Y" path to a block 428 where the base station 18 proceeds to output or display the coordinate information to the user at the base station 18. Thereupon, the flow proceeds from block 428 to a block 430 wherein the routine ends.

Returning to block 424 of FIG. 10, if the base station 18 determines that it did not receive the coordinate information as requested, then the flow proceeds to block 426 along the "N" path to a decision block 426. In block 426, the base station 18 determines whether the most recent page of the object locator 42 was, in fact, the last attempt permitted within the protocol for the base station-E operation. If the result is affirmative, then the flow proceeds along the 'Y' path to block 418 where the object locator 42 operates to disable the GPS receiver 78 so that it no longer uses power from the battery 70 of the object locator 42 and thereafter proceeds to block 430 where the routine ends. If, however, the result of the determination in block 426 was negative, then the flow returns to the start of the routine at the input to block 404 where the base station 18 re-attempts to page the object locator 42.

Returning now to block 408 in FIG. 10, the object locator 42 checks to determine whether location coordinate information is, in fact, in the memory 68 of the object locator 42. If the result is negative, the flow proceeds along the "N" path to block 414 where the object locator 42 acquires the new coordinate information and, as previously described, proceeds in block 416 to store the new coordinate information in memory 68 of the object locator 42. The flow then returns to the input of block 412 wherein the GPS receiver 78 is enabled.

The above noted object location system was disclosed as being utilized in conjunction with a pet, such that the pet owner can determine the location of their wayward pet. The locator, as described hereinabove, in one embodiment, is triggered to determine the location of the pet in response to receiving a signal from a paging system. The paging system utilizes existing infrastructure in order to direct a message over a wireless link to a moving object, such as the pet. This only requires the inclusion of a paging receiver tuned to the frequency of the paging transmitters. Of course, there are multiple paging transmitters disposed about any given area. If the pet wandered outside of the range of all of these paging transmitters, then the system will not work. This would then, in the alternative, require a direct RF link to the pet.

Once the object locator 42 has received the request, the locator 42 will do one of two things. First, it could merely search its own memory to determine if location coordinates are stored therein from a previous acquisition operation of the GPS system. If so, these could be transmitted back to the requester. Alternatively the GPS system is turned on in response to receiving the request and then the location determined. Of course, as described hereinabove, there are provisions made for situations wherein the GPS system cannot be acquired.

When the information is to be transmitted back to the user, the disclosed embodiment sets forth the use of a two-way pager. These two-way pagers are desirable in that they make use of the existing infrastructure of the paging system. This is facilitated by the inclusion of a plurality of receivers at each of the paging towers or paging "sticks" which allow the signal to be received and forwarded back to a central station. This central station then processes the information received and forwards it to the user. This information, as described hereinabove, is in the form of coordinates. This coordinate information can then be relayed back to the user in any number of ways. It could actually be forwarded via a paging channel to the user, which might result in a latency of approximately two to five minutes. Alternatively, it could be transmitted directly to the user, providing there was such an infrastructure. This infrastructure could even incorporate the use of a cellular telephone system. In any event, it is necessary to have the coordinates relayed back to the user in order to determine the relative location of the user and the wayward pet. The two-way system that can be utilized is a conventional system, one example of such a conventional system described in U.S. Pat. No. 5,708,971, issued Jan. 13, 1998, entitled "TWO-WAY PAGING SYSTEM AND APPARATUS," which is incorporated herein by reference.

Figure 11:
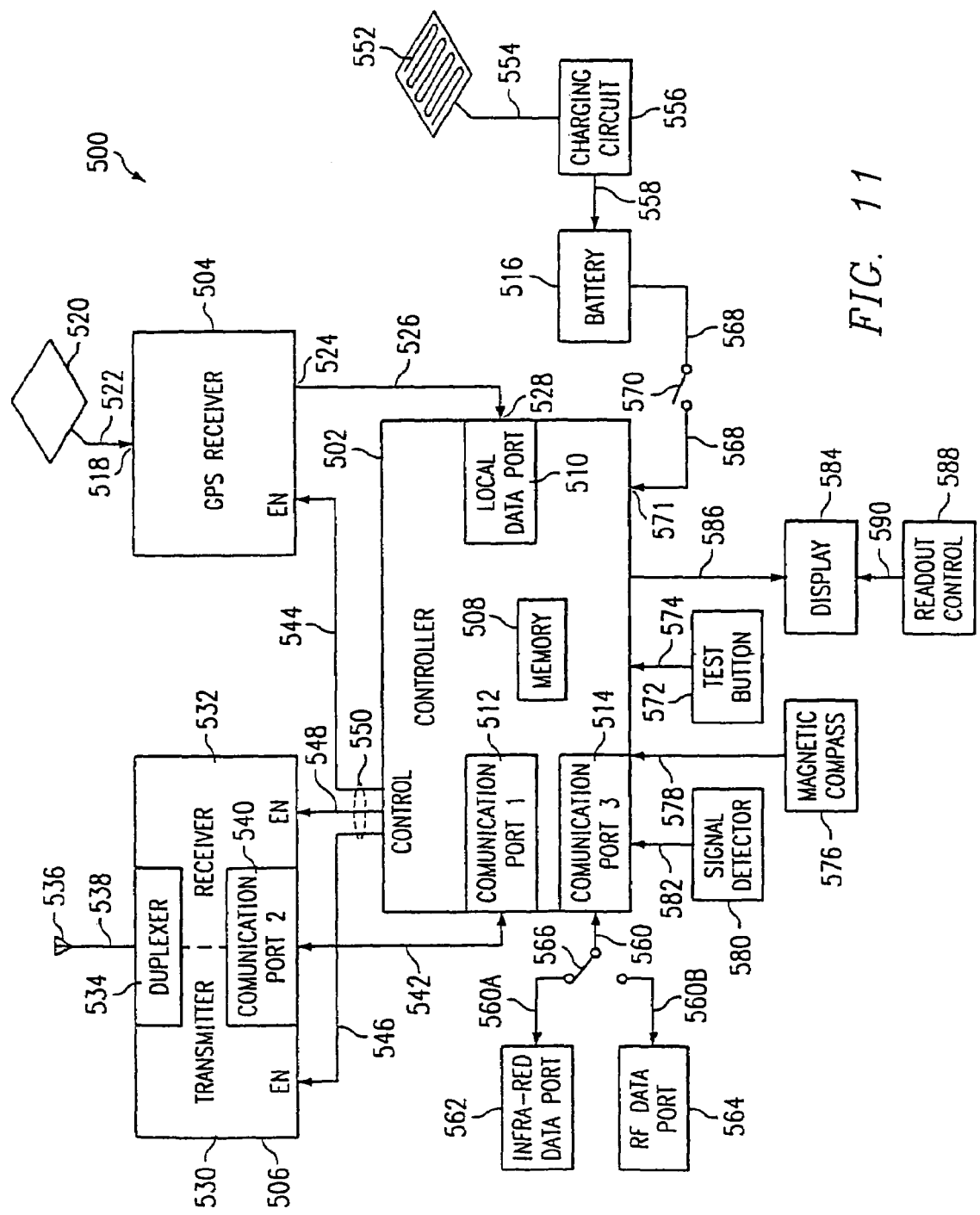
FIG. 11 illustrates a block diagram of an alternate embodiment of the object locator of FIG. 4.

Referring now to FIG. 11, there is illustrated a block diagram of an alternate embodiment of an object or pet locator of the present disclosure. The object locator 500 comprises three major circuit blocks, a controller 502, a GPS receiver 504 and a communication transceiver 506. Included in controller 502 which may be a standard type microcontroller or microprocessor, is a memory 508. Memory 508 may include random access memory (RAM), non-volatile RAM or some form of read-only memory (ROM). Controller 502 further includes a location data port 510 for receiving location data from GPS receiver 504. Controller 502 also includes a first communication port 512 for exchanging data with communication transceiver 506. Controller 502 further includes a third communication port 514 for exchanging data with an infrared data port 562 or an RF data port 564.

The data is exchanged between the third communication port 514 along a bidirectional data bus 560 which couples the third communication port 514 with a data bus selector 566 which selects between a data bus 560A coupled to infrared data port 562 or couples via data bus 560B to RF data port 564. Also coupled to controller 502 is a rechargeable battery 516 which may receive energy during recharging from solar cell 552 which is coupled along a path 554 to a charging circuit 556 which in turn is coupled to the rechargeable battery 516 along a path 558. Power from the rechargeable battery 516 is coupled along path 568 which includes an SPST switch 570 in series with path 568 for controlling the application of power to a terminal 571 on the controller 568. Power is connected from the terminal 571 to the GPS receiver 504 and the communications transceiver 506 along a path not shown in FIG. 11 for clarity. Alternatively, the charging circuit 556 may be configured otherwise than with connection to a solar cell 552. For example, charging circuit 556 may be a mechanical electric generator actuated by moments of object locator 500 when attached to a wearer of the object locator 500.

Continuing further with FIG. 11, the GPS receiver 504 receives signals at an input 518 from a patch antenna 520 via a path 522. The output of the GPS receiver 504 is coupled from an output 524 along a path 526 to an input terminal of the location data port 510 within controller 502. GPS receiver 504 is enabled by a control signal originating within controller 502 and coupled from an output 550 along a path 544 to an enable terminal of GPS receiver 504. The communication transceiver 506 includes a duplexor 534 which interfaces between the transmitter 530 and receiver 532 portions of the communication transceiver 506 and a dual mode antenna 536 via a transmission line 538. Duplexor 534 provides the interface between the respective transmit and receive modes during the operation of communication transceiver 506, enabling the communication transceiver 506 to use a common antenna 536. The transmitter portion 530 of communication transceiver 506 is enabled for its operation along a path 546 originating in controller 502 and coupled from an output 550 to an enable terminal on transmitter 530. Similarly, the receiver portion 532 of communication transceiver 506 is enabled by a control signal originating within controller 502 and coupled from the control outputs 550 along a path 548 to an enable terminal of receiver 532. The signal outputs from communication transceiver 506 are coupled from the receiver 532 via a second communication port 540 along a path 542 to an input of the first communication port 512 within controller 502. Signals to be transmitted, originating within controller 502 are coupled from first communication port 512 along the bidirectional data path 542 to an input terminal of the second communication port 540 coupled therefrom into the transmitter 530 within communication transceiver 506.

Continuing with FIG. 11, a display 564 is provided to display data coupled along a path 566 from the controller 502. The display 564 may be typically a liquid crystal display having a capability of a small number of lines of text or symbols. The display 564 may be caused to access data within controller 502 by the use of a readout control 568 which is coupled to the display along a path 570. Readout control 568 may be used to activate or deactivate the display, to scroll through various lines of data available for display or to select particular information to be displayed. Also coupled to controller 502 is a test button 572 via a path 574 which enables the user to manually actuate the object locator 500 to cause an operational test according to a routine stored within controller 502 to check various selected functions of the object locator 500. Another device coupled to controller 502 includes a magnetic compass 576 which provides an output signal along a path 578 to the controller 502 to provide information regarding the direction or heading of successive coordinate positions obtained and reported by the object locator 500. A signal detector 580 provides an output along a path 582 to the controller 502 when a parameter of the RE signals received by the object locator 500 exceed a predetermined threshold for the purpose of determining whether or not the object locator 500 is within or outside of the useful operating range or to define the minimum distance of the base station location before which the object locator 500 is not enabled to operate and obtain location coordinate data because the object locator or the pet locator is attached to an object or a pet animal which is very close to the base station and, for example, line of sight distances short enough for accurate and ready visual location of the object or pet.

It will be appreciated that in some implementations of the object locator embodiment illustrated in FIG. 11 that all of the features shown will be useful in the particular application. However, in other applications it will be appropriate to select some but not all of the available features shown in FIG. 11. Thus FIG. 11 represents a composite embodiment of the object locator 500 with a selection of typical features to illustrate some of the possible functions that may be accomplished with the object locator 500 of the present disclosure. In operation the various features illustrated in FIG. 11 may be useful in the following ways. For example, the memory 508 in controller 502 may contain information as to the wearer's name, it's home address, a contact telephone number, vaccination status, veterinarian name and any other pertinent information that would be appropriate for an object locator 500 worn by a pet animal. In some applications a program in controller 502 may be organized to store a portion of the operational data in a non-volatile memory within memory 508 for purposes of data backup. Similarly, location and associated time data may be stored for recall during operations which calculate direction and rate of movement information for transmitting to the base station along with the current coordinate information. The information stored in memory 508 such as the wearer's name, home address, contact telephone number, vaccination status, veterinarian's name and the like may also be output to the display 564 by operation of the readout control 568. This particular feature enables someone who finds the pet animal wearing object locator 500 to access the information stored within the object locator memory 508 and take appropriate action to return the pet to its owner or to render assistance to the pet if such assistance is indicated.

Continuing further with FIG. 11, one of the functions of the signal detector 580 is to provide an indication when the object locator is about to move beyond its normal range of operation with respect to the base station and send a message to the base station indicating that the object locator 500 is about to become out of communication with the base station. In another mode, the object locator 500 is enabled to send a message to the base station if the satellite signal is lost, that is, the GPS receiver 504 is no longer receiving location information transmissions from the global satellite system. In this event, for an object locator 500 that is equipped with a magnetic compass 576, the magnetic compass 576 may be activated to send direction information to the base station if the satellite signal is lost thereby providing information as to the last known location and heading of the object locator 500.

Continuing with FIG. 11, the infrared data port 562 and the RF data port 564 are provided to write or read data to or from the memory 508 in controller 502 via the third communication port 514. It will be appreciated that the infrared data port 562 may typically include an optical transducer which is not shown for clarity and associated interfacing circuitry also not shown between the optical transducer and the controller 502. The optical transducer and the associated interface circuitry are well known in the art and will not be further described herein. As an example of the operation, data may be downloaded from the object locator 500 via the infrared data port 562 as an alternative to sending a communication command from the base station to the object locator 500. Similarly, data may also be downloaded from the object locator 500 through the RE data port 564 as an alternate technique. As another example, data may be uploaded to the object locator through either the infrared data port 562 or the RE data port 564 by appropriately selecting the data bus selector 562 to couple the data to the third communication port 514 in controller 502.

In the illustrative example disclosed herein, a pet owner desiring to use the pet locator contacts and subscribes to a paging service and obtains a two-way paging transceiver or, "pager," which may or may not be included in the purchase price of the pet locator. The owner with the pager becomes the host or base station. The pet locator is attached to the pet and the pet locator energized, typically by a switch on the pet locator assembly to activate the pet locator. The owner defines a designated enclosed area substantially surrounding the location of the host, e.g., a residence lot. The center of this enclosed area may be called an origin. This designation allows the pet locator to become active only when it is outside or beyond the perimeter of the designated enclosed area, where it can obtain location information about its location from the global positioning satellite system and communicate it to the host. Reports of location data may be transmitted automatically at regular intervals under the control of the pet locator or, alternatively it may be transmitted upon a request transmitted from the host or base station. An advantage of the "automatic reporting" pet locator system of the present disclosure is that once the user or pet owner becomes a subscriber to the paging system (any conventional two-way paging system will suffice) and installs and energizes, i.e., activates the pet locator by defining a designated area, no other action is required other than to observe the readout of the location data at the host location or base station. The installation procedure designates or enters the location of the host and defines the boundary or perimeter of the designated area. The boundary of the designated area may be set by entering the coordinates of a single location, e.g., the farthest or other corner of the user's residence property or even a central location. Thus the designated area will approximate, for example, a circle centered at the host location and having a radius equal to the distance from the center at the specified single coordinate location to the perimeter of the circle defining the range of error or position uncertainty which is provided by the GPS system along with the location data. The boundary of the designated area may also be set by the owner entering the coordinates of a plurality of location points to designate a specific area or perhaps, a non-circular area. It will be appreciated that the advantage of owner-entered coordinates is that only a minimum number of points need be entered, memory size in the pet locator is minimized thus lowering the cost, and set-up operation is straightforward and simple. One example of a designated area might resemble the circular area shown in FIG. 7 where the boundary 130 encloses the designated area having a specified radius.

Although the preferred embodiment has been described in detail, it should be understood that various changes, substitutions and alterations can be made therein. For example, the object locator disclosed hereinabove is intended to be useable in a variety of applications for locating or tracking an individual, an object or an animal, either wild, domestic or a pet. Thus the term pet locator is intended to apply to the above variety of applications without departing from the spirit and scope of the invention as defined by the appended claims.

What is claimed is:

1. A position determining device, comprising:
   a satellite navigation receiver for automatically providing computed position information from an output of said satellite navigation receiver for transmission to a host paging receiver when said provided position information indicates said device has changed its position relative to a predetermined location;
   a first two-way communication device configured to transmit to said host paging receiver and having a transmitting input coupled to said output of said satellite navigation receiver wherein said provided position information is transmitted to said host paging receiver responsive to receiving said computed position information at said transmitting input for readout of said provided position information at said host paging receiver; wherein said position determining device is configurable as a portable unit; and
   wherein said position determining device comprises a rechargeable battery.

* * * * *